US010137841B1

(12) United States Patent
Neag et al.

(10) Patent No.: US 10,137,841 B1
(45) Date of Patent: Nov. 27, 2018

(54) AUTOMOTIVE VEHICLE WITH EXPANDABLE UNDERSEAT STORAGE COMPARTMENT

(71) Applicants: Dorinel Neag, Commerce Township, MI (US); Jeffery E Long, Canton, MI (US); Kyle Neighbors, Milford, MI (US); Jimmy L Suder, Ortonville, MI (US); Stuart E Collins, New Haven, MI (US); Steven J Schenten, Oxford, MI (US)

(72) Inventors: Dorinel Neag, Commerce Township, MI (US); Jeffery E Long, Canton, MI (US); Kyle Neighbors, Milford, MI (US); Jimmy L Suder, Ortonville, MI (US); Stuart E Collins, New Haven, MI (US); Steven J Schenten, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/689,537

(22) Filed: Aug. 29, 2017

(51) Int. Cl.
*B60R 7/04* (2006.01)
*B60N 2/62* (2006.01)
*B60N 2/68* (2006.01)
*B60N 2/30* (2006.01)
*F16B 1/00* (2006.01)
*B60N 2/90* (2018.01)

(52) U.S. Cl.
CPC ............ *B60R 7/043* (2013.01); *B60N 2/3047* (2013.01); *B60N 2/62* (2013.01); *B60N 2/682* (2013.01); *B60N 2/919* (2018.02); *B60Y 2410/132* (2013.01); *F16B 2001/0035* (2013.01)

(58) Field of Classification Search
CPC ...................................................... B60R 7/043
USPC ...................................................... 296/37.15
See application file for complete search history.

(56) References Cited

U.S. PATENT DOCUMENTS

| 5,957,521 | A | * | 9/1999 | Schlachter | ............... | B60N 2/90 |
| | | | | | | 296/37.15 |
| 6,074,000 | A | | 6/2000 | Wagner | | |
| 6,644,523 | B1 | | 11/2003 | Salas | | |
| 7,341,301 | B1 | | 3/2008 | Schernbre et al. | | |
| 7,780,229 | B2 | | 8/2010 | Verhee | | |
| 8,096,610 | B2 | * | 1/2012 | Ganti | ..................... | B62D 25/20 |
| | | | | | | 224/275 |
| 8,128,163 | B2 | | 3/2012 | Alberti | | |
| 8,770,661 | B2 | * | 7/2014 | Kalergis | .................. | B60R 7/043 |
| | | | | | | 296/37.15 |
| 9,016,749 | B2 | * | 4/2015 | Mueller | .................. | B60R 5/006 |
| | | | | | | 296/37.14 |
| 9,873,383 | B1 | * | 1/2018 | Mather | ..................... | B60N 2/02 |
| 2017/0072863 | A1 | * | 3/2017 | Rowland | ................. | B60R 7/043 |

* cited by examiner

*Primary Examiner* — Gregory A Blankenship
(74) *Attorney, Agent, or Firm* — Ralph E. Smith (57) ABSTRACT

An automotive vehicle has an expandable underseat storage compartment. An elongated seat support member supports a row of vehicle seats and has a middle portion and right and left end pedestals. A front panel assembly extends laterally across the vehicle in front of the right and left end pedestals and is movable between retracted and extended positions position wherein when the front panel assembly is in the extended position the storage space of the storage compartment is larger than when the front panel assembly is in the retracted position.

9 Claims, 8 Drawing Sheets

AUTOMOTIVE VEHICLE WITH EXPANDABLE UNDERSEAT STORAGE COMPARTMENT

FIELD

The present disclosure relates an automotive vehicle having an expandable underseat storage compartment.

BACKGROUND

Some vehicles include cargo compartments for storing various miscellaneous items so that the items do not roll or move around on the vehicle floor while the vehicle is in motion. These compartments are difficult to operate and do not adapt well to different vehicle floor configurations. Furthermore, these compartments provide limited storage space, which makes it difficult for adding items that are accumulated over the course of the occupant's travel. cl SUMMARY This section provides a general summary of the disclosure, and is not a comprehensive disclosure of its full scope or all of its features.

In accordance with an aspect of the present disclosure, an automotive vehicle has an expandable underseat storage assembly having a storage compartment. The vehicle has a floor and at least one row of rear seats. An elongated seat support member extends upwardly from the floor of the vehicle and supports the row of rear seats. The elongated seat support member has a middle portion that extends laterally across the vehicle and right and left end pedestals that extend longitudinally forward from right and left ends of the middle portion. Right and left bracket plates are disposed adjacent outer walls of the right and left end pedestals. The right and left bracket plates are fixedly attached to one or both of the vehicle floor and respective ones of the right and left end pedestals of the elongated seat support member. A front panel assembly extends laterally across the vehicle in front of the right and left end pedestals and is rotatably coupled to the right and left bracket plates. The elongated seat support member, the right and left bracket plates and the front panel assembly defining a storage area of the storage compartment wherein the middle portion of the elongated seat support member defines a rear side of the storage compartment, the right and left end pedestals and the right and left bracket plates define right and left sides of the storage compartment and the front panel assembly defines a front side of the storage compartment. The front panel assembly is movable between an extended position and a retracted position wherein when the front panel assembly is in the extended position the storage space of the storage compartment is larger than when the front panel assembly is in the retracted position. The front panel assembly has a primary panel and a secondary panel hingedly attached to each other along respective lateral edges. When the front panel assembly is in the retracted position, the primary and secondary panels lay against each other in a vertical position with the hingedly attached lateral edges of the primary and secondary panels being upper lateral edges of the primary and secondary panels and the primary and secondary panels are adjacent front edges of the right and left end pedestals of the elongated seat support member and the vertical primary and secondary panels define the front side of the storage compartment with the storage space defined by the primary panel and the elongated seat support member. When the front panel assembly is moved to the extended position, the primary panel is rotated forwardly and downwardly and extends forwardly from the right and left end pedestals and the secondary panel is rotated forwardly and upwardly so that it extends vertically upwardly from the primary panel wherein the vertical secondary panel when the front panel assembly is in the extended positioned is spaced forwardly from a position of the vertical primary and second panels when the front panel assembly is in the retracted position and the storage space is defined by the vertical secondary panel, the right and left bracket plates and the elongated seat support member.

In accordance with an aspect of the present disclosure, the elongated support member and the right bracket plate cooperate to define a right recess and the elongated support member and the left bracket plate cooperate to define a left recess wherein when the front panel assembly is in the retracted position a right cover plate is received in the right recess and a left cover plate is received in the left recess.

In accordance with an aspect of the present disclosure, the right cover plate is rotatably coupled to the right bracket plate and the left cover plate is rotatably coupled to the left bracket plate. In accordance with an aspect of the present disclosure each cover plate has a flange extending from a periphery of that cover plate and a right end of the primary panel is coupled to the flange of the right cover plate and a left end of the primary panel is coupled to the flange of the left cover plate.

In accordance with an aspect of the present disclosure, when the front panel assembly is in the extended position a right end of the secondary panel abuts against the flange of the right cover plate and a left end of the secondary panel abuts against the flange of the left cover plate.

In accordance with an aspect of the present disclosure, each of the right and left ends of the secondary panel includes at least one magnetic element and the right and left cover plates include at least one corresponding magnetic element wherein when the front panel assembly is in the extended position, the magnetic elements of the right and left ends of the secondary panel magnetically engage with corresponding magnetic elements of the right and left cover plates to retain the front panel assembly in the extended position.

In accordance with an aspect of the present disclosure, the front panel assembly is configured to be rotated from the extended position to the retracted position with the secondary panel extending horizontally rearwardly from the upper lateral edge of the primary panel such that the secondary panel provides a top cover over at least a portion of the storage compartment.

In accordance with an aspect of the present disclosure, the secondary panel includes at least one divider and a corresponding recess in which the divider is received, the divider panel pivotably attached to the secondary panel and when the front panel assembly is in the extended positon, the divider is pivotable from a retracted position where it is received in the corresponding recess to an extended positon where it extends outwardly from the recess and when the divider is in the extended position it divides the storage compartment into sub-compartments.

In accordance with an aspect of the present disclosure, one of the elongated support member and the front panel assembly includes a latch mechanism and the other of the elongated support member and front panel assembly includes a latch member, the latch member engageable with and releasable from the latch mechanism, the latch mechanism and latch member holding the front panel assembly in the retracted position when the latch mechanism is engaged with the latch member and when the latch member is released from the latch mechanism the front panel assembly is movable to the extended positon.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will not be described more full with reference to the accompanying drawings.

With reference to FIGS. 1-7, an automotive vehicle 8 (shown representatively by dashed-box 8) has an expandable underseat storage compartment 24 between a vehicle rear seat assembly 12 and a vehicle floor 14. It should be understood that vehicle rear seat assembly 12 is a seat assembly disposed rearward of a front seat assembly of the vehicle and need not be the most rearward seat assembly in the vehicle, such as in the case where the vehicle has a middle row seat assembly behind the front seat assembly and a back seat assembly behind of the middle row seat assembly. It should also be understood that references to right, left, front, forward, rear, etc. are with respect an occupant of the vehicle facing forward.

The seat assembly 12 includes right and left seat bottoms 16a, 16b, respectively, (together known as a set of seat bottoms 16) and an elongated seat support member 18 having a middle portion 33, a middle pedestal 210, and right and left end pedestals 32a, 32b, respectively, at right and left ends 31a, 31b, respectively, of middle portion 33. Middle portion 33 extends laterally across vehicle 8 and right and left end pedestals 32a, 32b extend longitudinally forward from respective right and left opposed ends 31a, 31b of middle portion 33. Right and left bracket plates 20a, 20b, respectively, are affixed to right and left end pedestals 32a, 32b. A front panel assembly 22 extends laterally across vehicle 8 in front of the right and left bracket plates 20a, 20b and right and left end pedestals 32a, 32b.

Elongated seat support member 18, right and left bracket plates 20a, 20b, and front panel assembly 22 cooperate to provide an expandable underseat storage compartment assembly 10. The elongated seat support member 18, the right and left bracket plates 20a, 20b, and the front panel assembly 22 cooperate to define storage compartment 24 wherein middle portion 33 of the elongated seat support member 18 defines a rear side 200 of the storage compartment 24, right and left end pedestals 32a, 32b of the elongated seat support member and right and left bracket plates 20a, 20b define right and left sides 202a, 202b of storage compartment 24 and front panel assembly 22 defines a front side 204 of storage compartment 24.

Figure 4:
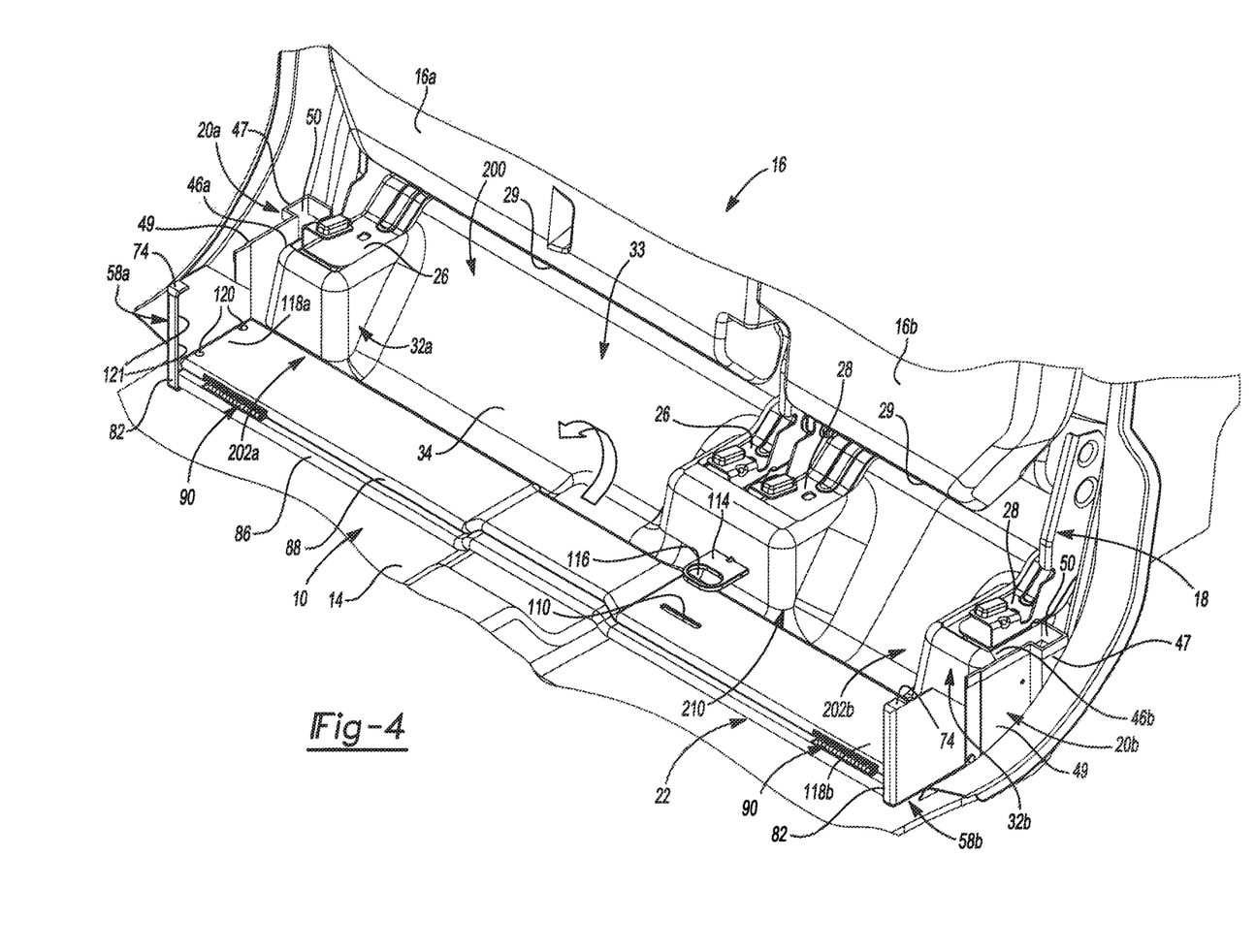
FIG. 4 is a perspective view of the vehicle cargo assembly of FIG. 1 attached to the elongated seat support member of the vehicle floor being moved to the extended position with the seat bottoms in the lifted state.
Figure 5:
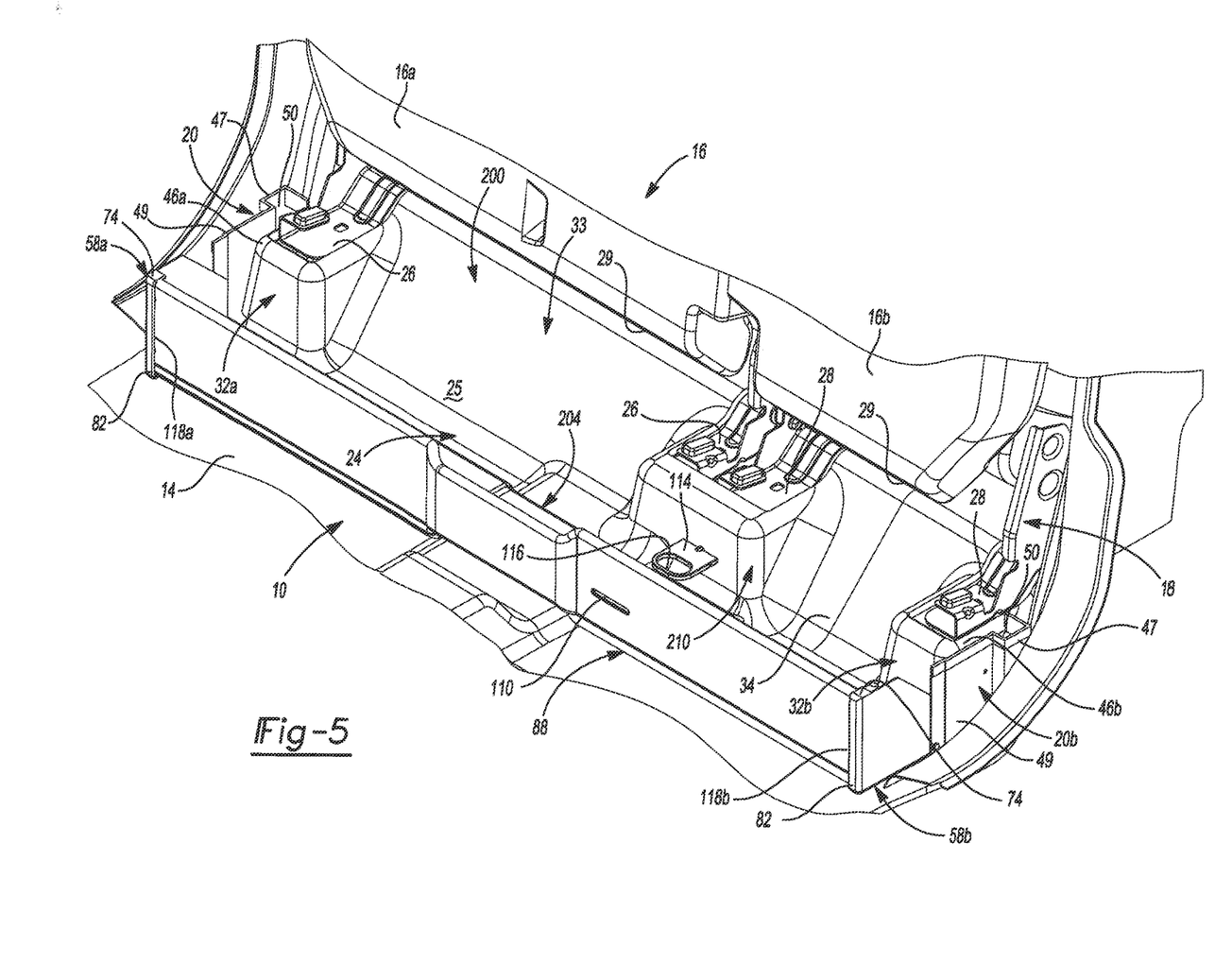
FIG. 5 is a perspective view of the vehicle cargo assembly of FIG. 1 attached to the elongated seat support member of the vehicle floor in the extended position with the seat bottoms in the lifted state.
Figure 6:
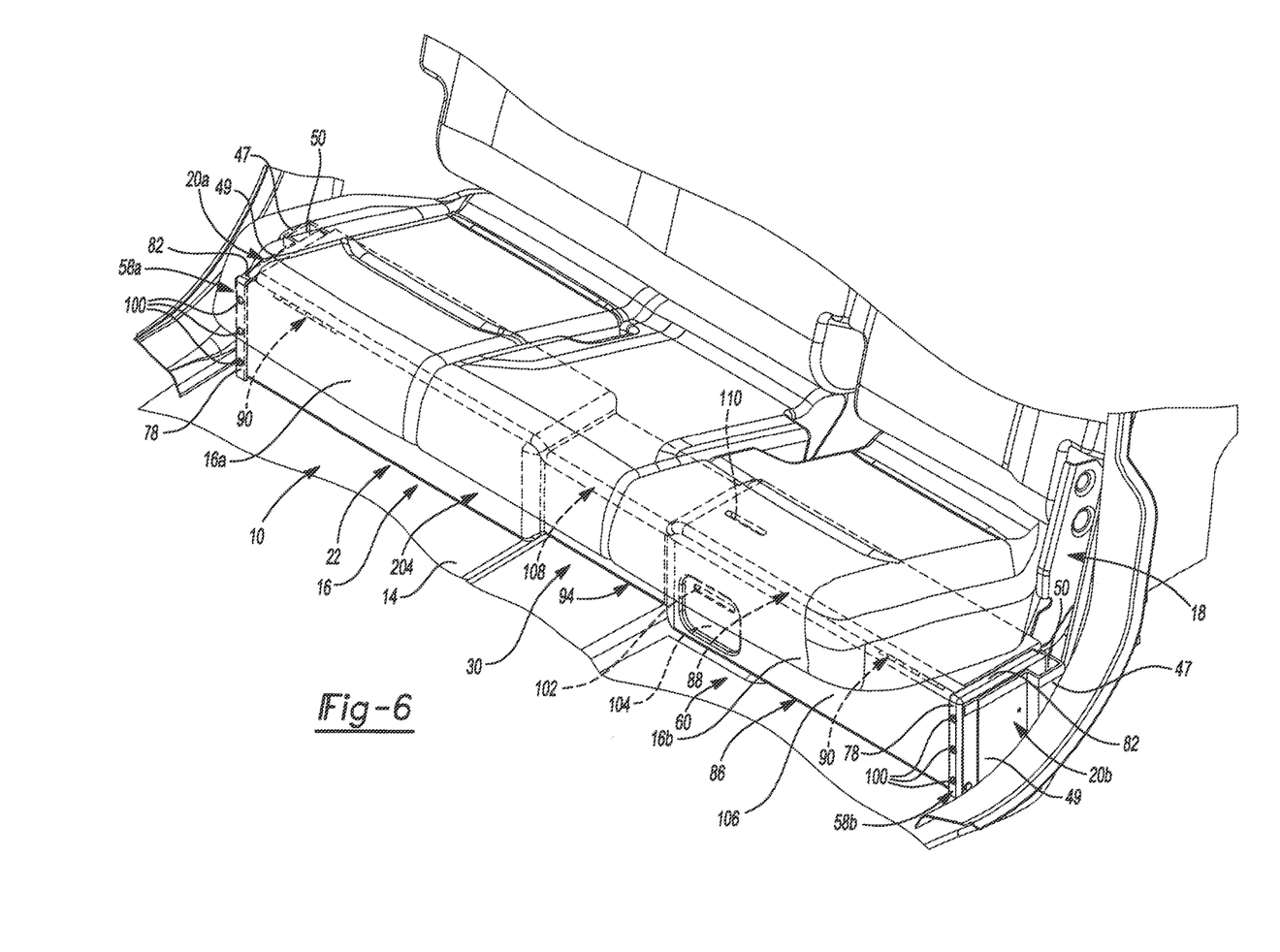
FIG. 6 is a perspective view of the vehicle cargo assembly of FIG. 1 attached to the elongated seat support member of the vehicle floor in the extended position with the seat bottoms in a seated state.

The right seat bottom 16a of the vehicle seat assembly 12 is coupled to the elongated seat support member 18 via a pair of right runner assemblies 26 while a left seat bottom 16b of the vehicle seat assembly 12 is positioned adjacently to the right seat bottom 16a and coupled to the elongated seat support member 18 via a pair of left runner assemblies 28. The right and left seat bottoms 16a, 16b are independently rotatable relative to the elongated seat support member 18 between a seated state (FIG. 6) and a lifted state (FIGS. 2-5 and 7). The right and left seat bottoms 16a, 16B when in the seated position provide a top cover over at least a portion of portion of storage compartment 24. As will be described in more detail below, the front panel assembly 22 is movable between a retracted position in which the front side 204 of storage compartment 24 is adjacent fronts sides 208a, 208b of the right and left end pedestals 32a, 32b of elongated seat support member 18 and an extended position in which the front side 204 of storage compartment 24 is spaced forwardly from the front sides 208a, 208b of right and left end pedestals 32a, 32b of elongated seat support member 18. In an aspect, when the front panel assembly 22 is in the extended position, the front side 204 of storage compartment 24 is at or near a front end 30 of the set of seat bottoms 16 when the seat of seat bottoms 16 are in a seated position (FIG. 6). When front panel assembly 22 is in the extended position, a storage area 25 of storage compartment 24 is larger than when front assembly 22 is in the retracted position.

The elongated seat support member 18 extends upwardly from the vehicle floor 14 and in addition to right and left end pedestals 32a, 32b, middle portion 33, and middle pedestal 210, also includes a pair of sloped surfaces 34. End pedestals 32a, 32b include respective vertical inner walls 36a, 36b and respective vertical outer walls 38a, 38b. The pair of sloped surfaces 34 are between the right and left end pedestals 32a, 32b and are separated by the middle pedestal 210. The pair of sloped surfaces 34 also extend from a top edge 212 of the elongated seat support member 18 to the vehicle floor 14, and are so shaped to accommodate contours of the vehicle floor 14.

The right and left bracket plates 20a, 2b are fixedly mounted to the vehicle floor 14 at right and left end pedestals 32a, 32b of the elongated seat support member 18. The right and left bracket plates 20a, 20b are adjacent to corresponding right and left outer walls 38a, 38b of the respective right and left end pedestals 32a, 32b of elongated seat support member 18 and attached to the vehicle floor 14 via fasteners (not shown). It should also be understood that in an aspect, each right and left bracket plate 20a, 20b, is attached to a corresponding right and left outer wall 38a, 38b of the corresponding right and left end pedestals 32a, 32b, instead of, or in addition to, being attached to the vehicle floor 14. The right and left bracket plates 20a, 20b, cooperate with the corresponding right and left end pedestal 32a, 32b of the elongated seat support member 18 to define right and left recesses 46a, 46b (FIGS. 4 and 5). Each bracket plate 20a, 20b includes an attachment section 47 and a pivot section 49. The attachment section 47 attaches the respective bracket plate 20a, 20b to the vehicle floor 14 and includes a wall 48 having a partition 50, an attachment surface 52, and an elongated edge 54 extending therefrom.

Figure 1:
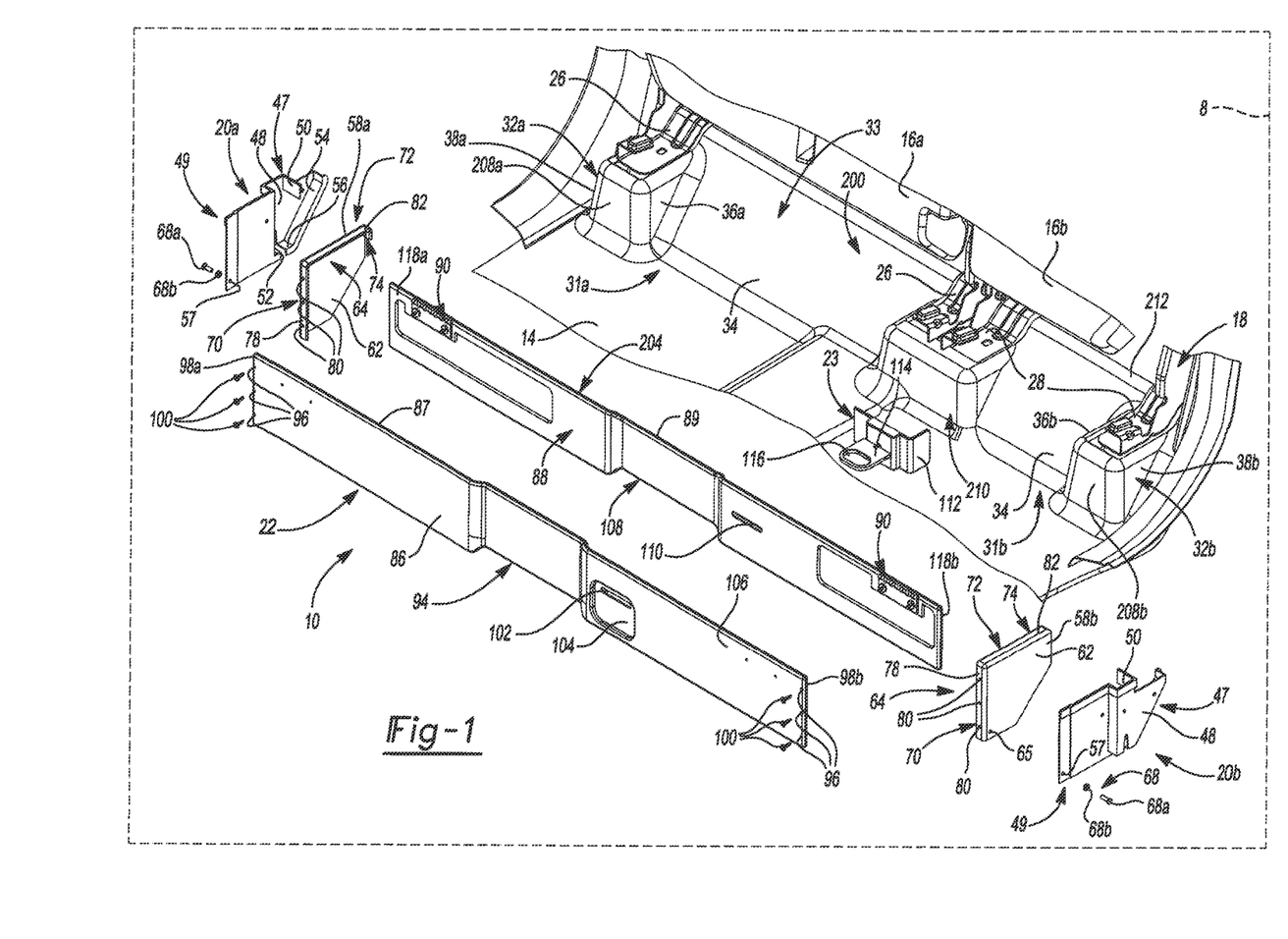
FIG. 1 is an exploded view of a vehicle cargo assembly according to the principles of the present disclosure.

The partition 50 extends outwardly from an upper portion of the wall 48 and defines an end of the recess 46. The attachment surface 52 extends outwardly from a lower portion of the wall 48 and is parallel to the vehicle floor 14. A fastener (not shown) extends through an aperture (not shown) formed in the attachment surface 52 so as to attach the respective bracket plate 20a, 20b to the vehicle floor 14. The elongated edge 54 extends outwardly from the upper portion of the wall 48 to the lower portion thereof. The elongated edge 54 has a lower surface 56 that is parallel to the vehicle floor 14. A fastener (not shown) illustratively extends through the lower surface 56 to further attach and secure the respective bracket plate 20a, 20b to the vehicle floor 14. As shown in FIG. 1, the pivot section 49 includes a pivot aperture 57 extending therethrough at a lower end thereof.

Figure 2:
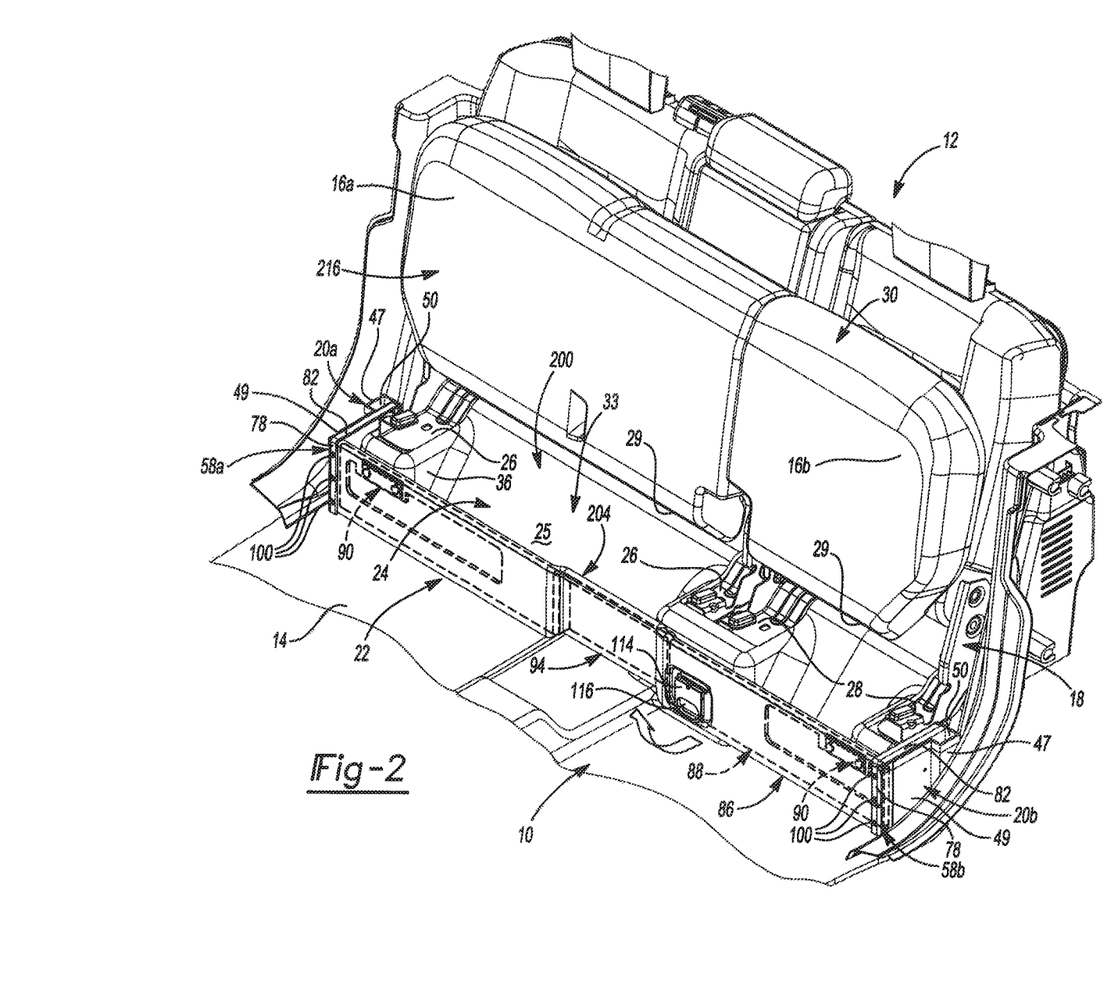
FIG. 2 is a perspective view of the vehicle cargo assembly of FIG. 1 attached to an elongated seat support member of a vehicle floor in a stowed position with the seat bottoms in a lifted state and a locking mechanism in a locked position.
Figure 3:
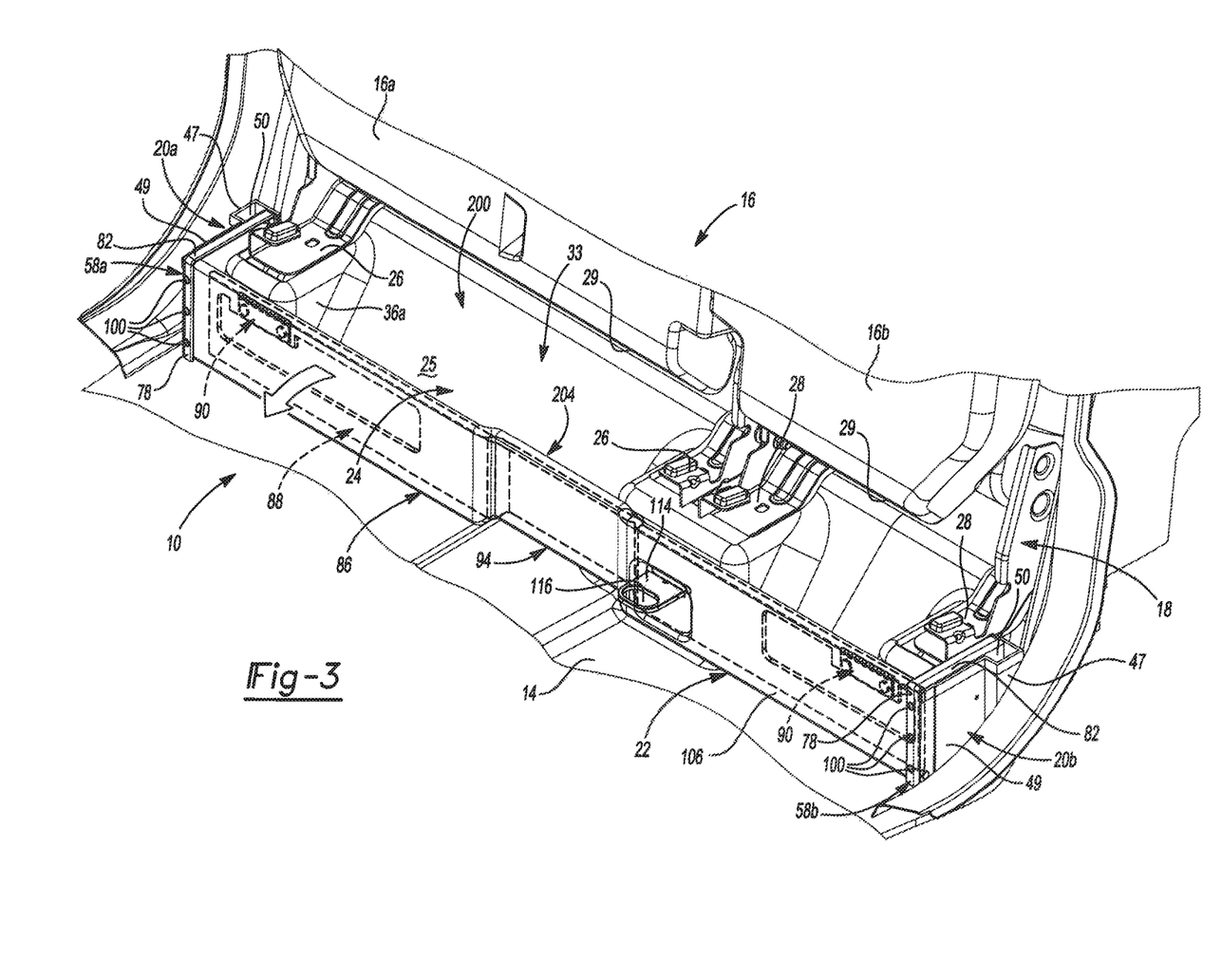
FIG. 3 is a perspective view of the vehicle cargo assembly of FIG. 1 attached to the elongated seat support member of the vehicle floor in the stowed position with the seat bottoms in the lifted state and the locking mechanism in an unlocked position.

The front panel assembly 22 is rotatably coupled to the right and left bracket plates 20a, 20b. The front panel assembly 22 includes right and left triangular-shaped cover plates 58a, 58b, a primary panel 86 and a secondary panel 88 with the primary panel 86 and the secondary panel 88 hingedly attached to each other along respective lateral edges 87, 89 via a pair of hinge assemblies 90. The right cover plate 58a is rotatably attached to right bracket plate 20a and the left cover plate 58b is rotatably attached to the left bracket plate 20b. The right cover plate 58a is configured to be received in the right recess 46a and the left cover plate 58b is configured to be received in the left recess 46b when the front panel assembly 22 is in the retracted position (FIGS. 2 and 3). Each cover plate 58a, 58b includes a wall 62 and a flange 64. As shown in FIG. 1, the wall 62 includes an aperture 65 extending therethrough at a lower end thereof. The aperture 65 is aligned with a respective aperture 57 of the pivot section 49 of the respective right or left bracket plate 20a, 20b such that a fastener 68a (e.g., bolt, rivet, etc.) of a fastener assembly 68 (composed of the fastener 68a and a washer 68b) extends through both apertures 57, 65, thereby, permitting the right or left cover plate 58a, 58b to pivot relative to the corresponding right or left bracket plate 20a, 20b. The flange 64 extends perpendicularly from a periphery of the wall 62 and includes an outer flange section 70, a middle flange section 72, and an inner flange section 74. The outer flange section 70 is parallel to the inner flange section 74 and perpendicular to the middle flange section 72. The outer flange section 70 includes an inside surface (not shown), an outer surface 78, and a plurality of apertures 80 (FIG. 1) extending therethrough. The middle flange section 72 is positioned between the outer flange section 70 and the inner flange section 74 and includes an outer surface 82 and an inside surface (not shown).

The front panel assembly 22 is disposed beneath the set of seat bottoms 16. The primary panel 86 is substantially rectangular and includes a primary handle 94 near a middle portion thereof that protrudes toward the secondary panel 88 when the front panel assembly 22 is in the retracted position (FIGS. 2 and 3). As shown in FIG. 1, the primary panel 86 also includes a plurality of apertures 96 at each right and left end 98a, 98b thereof. Each right and left end 98a, 98b of the primary panel 86 abuts against a corresponding inside surface (not shown) of the outer flange section 70 such that the apertures 96 align with a corresponding aperture 80 of the outer flange section 70. In this way, fasteners 100 extend through apertures 80, 96 of the outer flange section 70 and the primary panel 86, respectively, such that the primary panel 86 and the bracket plates 20a, 20b are secured to each other. A slot 102 is disposed in a recess 104 formed in a surface 106 of the primary panel 86.

The secondary panel 88 is substantially rectangular and includes a secondary handle 108 near a middle portion thereof that protrudes toward the elongated seat support member 18 when the front panel assembly 22 is in the retracted position. The secondary panel 88 also includes an oval-shaped slot 110 adjacent to the secondary handle 108 that is aligned with the slot 102 of the primary panel 86. A latch mechanism 23 is coupled to the middle pedestal 210 of the elongated seat support member 18 and includes an L-shaped bracket plate 112 and a lever 114. The L-shaped bracket plate 112 is disposed inside of the middle pedestal 210 of the elongated seat support member 18 such that it is concealed from users of the expandable underseat storage compartment assembly 10. The lever 114 is movably attached to the bracket plate 112 and includes an oval-shaped aperture 116 the allows the user (not shown) to conveniently move the lever between a locked state (FIG. 2) in which the lever 114 restricts the front panel assembly 22 from being moved to the extended position and an unlocked state (FIG. 3) in which the panel assembly 22 is allowed to move to the extended position. When in the locked state, the lever 114 extends through the slots 110, 102 of the secondary panel 88 and the primary panel 86, respectively, and is received in the recess 104 formed in the surface 106 of the primary panel 86 (FIG. 2).

With continued reference to FIGS. 1-7, operation of the front panel assembly 22 will be described in more detail. When the front panel assembly 22 is in the retracted position and at least one seat bottom (16a and/or 16b) of the set of seat bottoms 16 is in the lifted state (FIG. 2), the user is able to access the storage compartment 24 to store various items therein. In this position, storage space 25 of the storage compartment 24 is defined by the elongated seat support member 18, the right and left bracket plates 20a, 20b, and the primary panel 86 of the front panel assembly 22 (FIGS. 2 and 3).

If the user desires extra storage space, the user grasps and moves the lever 114 from the locked state to the unlocked state. The user then rotates the front panel assembly 22 ninety degrees counter-clockwise (FIG. 4). During rotation of the front panel assembly 22 ninety degrees counter-clockwise, the right and left cover plates 58a, 58b rotate relative to the corresponding right and left bracket plates 20a, 20b which are pulled out from the recesses 46 (FIG. 4).

The user then grasps the secondary handle 108 of the secondary panel 88 and rotates the secondary panel 88 ninety degrees counter-clockwise relative to the primary panel 86 such that the front panel assembly 22 is in the extended position and opposed right and left ends 118a, 118b of the secondary panel 88 abut against respective inside surface (not shown) of the middle flange section 72 of the corresponding right and left cover plates 58a, 58b. Each right and left end 118a, 118b of the secondary panel 88 includes one or more magnetic elements 120 attached thereto (FIG. 4) and the right and left cover plates 58a, 58b have corresponding magnetic elements 121 which cooperate to magnetically attract each other such that the secondary panel 88 is retained against the inside surface (not shown) of the middle flange section 72 of the cover plate 58 when the panel assembly 22 is in the extended position. In this regard the magnetic elements 120, 121 are both magnets or either magnetic element 120 and the corresponding magnetic element 121 is a magnet and the other is made of ferromagnetic material. In an aspect, cover plates 58a, 58B are made of as ferromagnetic material providing the magnetic element 121 without having a separate magnetic element as magnetic element 121. When front panel 22 is in the extended position, as shown in FIG. 6, the at least one seat bottom (16a and/or 16b) is rotated to the seated state and the secondary panel 88, the right and left cover plates 58a, 58b, the middle portion 33 and the right and left end pedestals 32a, 32b of elongated seat support member 18 and the right and left bracket plates 20a, 20b define the storage area 25 of storage compartment 24 extending from the rear end 29 of the set of seat bottoms 16 to the front end 30 thereof.

Figure 7:
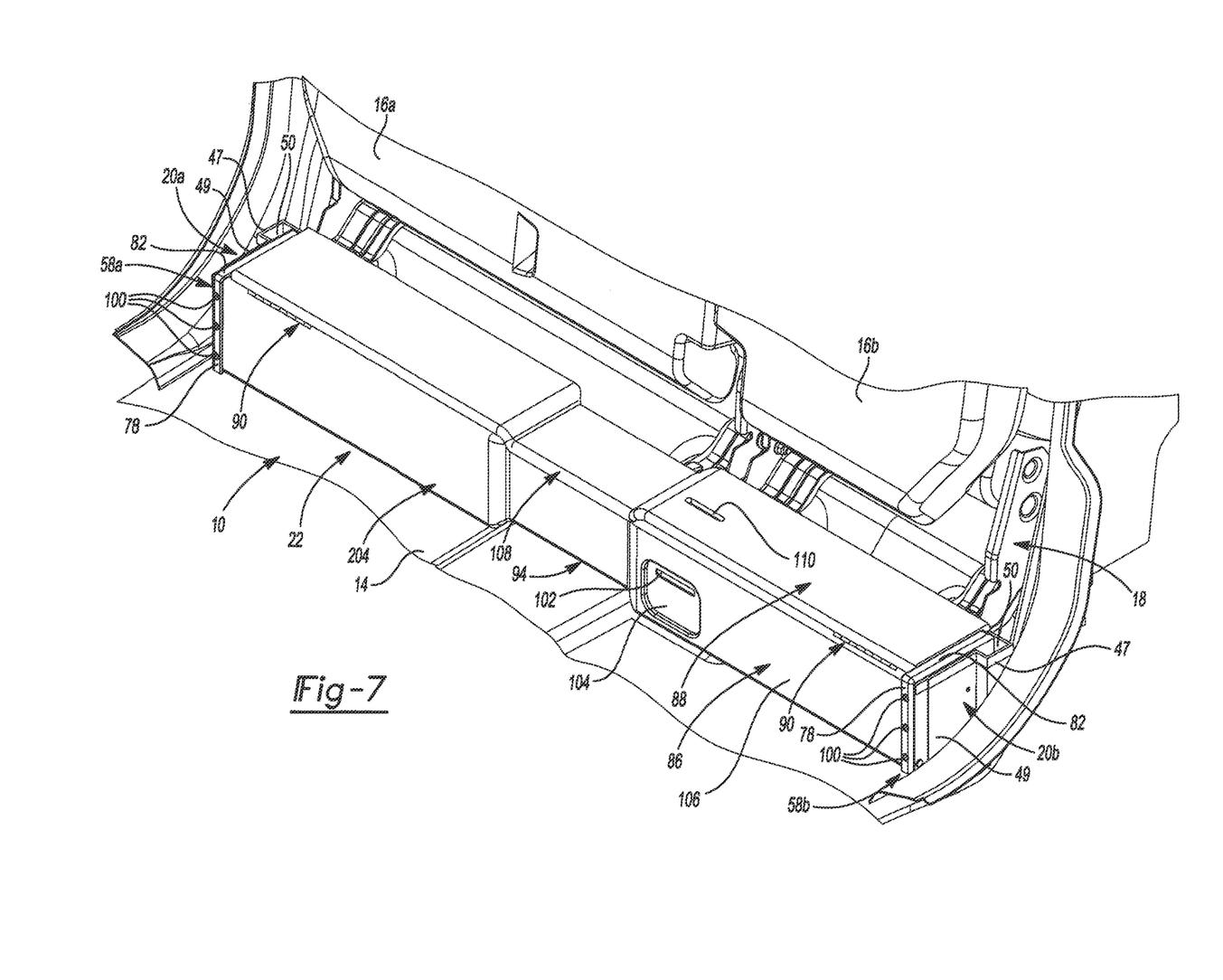
FIG. 7 is a perspective view of the vehicle cargo assembly of FIG. 1 attached to the elongated seat support member of the vehicle floor in an enclosed position with the seat bottoms in the lifted state.

In an aspect, secondary panel 88 provides a top cover that covers at least a portion of an opening of storage compartment 24. In such case, the user rotates the front panel assembly 22 ninety degrees clockwise after the front panel assembly has been rotated to the extended position and the secondary panel 88 has been rotated so that it is perpendicular to the primary panel. The right and left plates 58a, 58b rotate relative to the respective right and left bracket plates 20a, 20b and are received in the corresponding right and left recesses 46a, 46b (FIG. 7). In this position, the secondary panel 88 acts as a top to cover at least a portion of an opening (not shown) in the storage compartment 24 (FIG. 7).

Figure 8:
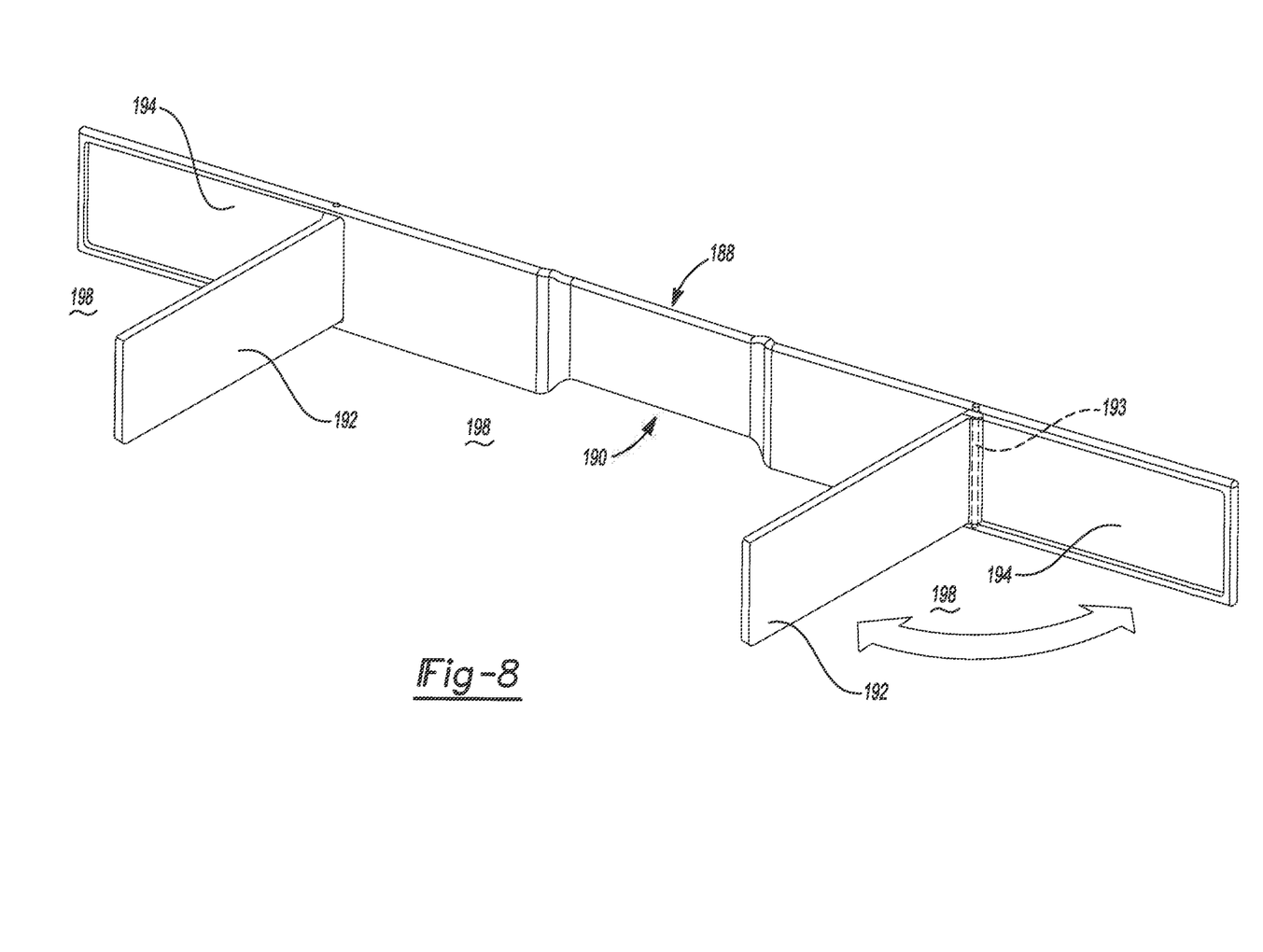
FIG. 8 is a perspective view of another secondary panel of the vehicle cargo assembly.

With reference to FIG. 8, in accordance with an aspect of the present disclosure, a secondary panel 188 that is a variation of secondary panel 88 is shown. Except as discussed below, the structure and function of the secondary panel 188 is similar or identical to that of the secondary panel 88.

The secondary panel 188 is substantially rectangular and includes a secondary handle 190 near a middle portion thereof, an oval-shaped slot (not shown) adjacent to the secondary handle 190, and a pair of rectangular dividers 192. Each divider 192 has a detent 193 (only one of which is shown in FIG. 8) that allows the divider 192 to move between a retracted state in which the divider 192 is received in a recess 194 formed in a corresponding end 196 of the secondary panel 188 and an extended state in which the divider 192 extends perpendicular to the recess 194 (FIG. 8). In this way, when the front panel assembly 22 is moved to the extended position as described above, the dividers 192 are extended such that sub-compartments 198 are formed in the storage compartment 24.

What is claimed is:
1. An automotive vehicle having an expandable underseat storage compartment, comprising;
a floor and at least one row of rear seats;
an elongated seat support member that extends upwardly from the floor of the vehicle and supports the row of rear seats, the elongated seat support member having a middle portion that extends laterally across the vehicle and right and left end pedestals that extend longitudinally forward from right and left ends of the middle portion;
right and left bracket plates disposed adjacent outer walls of the right and left end pedestals, the right and left bracket plates fixedly attached to one or both of the vehicle floor and respective ones of the right and left end pedestals of the elongated seat support member;
a front panel assembly extending laterally across the vehicle in front of the right and left end pedestals and rotatably coupled to the right and left bracket plates;
the elongated seat support member, the right and left bracket plates and the front panel assembly defining a storage area of the storage compartment wherein the middle portion of the elongated seat support member defines a rear side of the storage compartment, the right and left end pedestals and the right and left bracket plates define right and left sides of the storage compartment and the front panel assembly defines a front side of the storage compartment;
the front panel assembly movable between an extended position and a retracted position wherein when the front panel assembly is in the extended position the storage area of the storage compartment is larger than when the front panel assembly is in the retracted position, the front panel assembly having a primary panel and a secondary panel hingedly attached to each other along respective lateral edges
wherein when the front panel assembly is in the retracted position the primary and secondary panels lay against each other in a vertical position with the hingedly attached lateral edges of the primary and secondary panels being upper lateral edges of the primary and secondary panels and the primary and secondary panels are adjacent front edges of the right and left end pedestals of the elongated seat support member and the vertical primary and secondary panels define the front side of the storage compartment with the storage space defined by the primary panel and the elongated seat support member; and
when the front panel assembly is moved to the extended position, the primary panel is rotated forwardly and downwardly and extends forwardly from the right and left end pedestals and the secondary panel is rotated forwardly and upwardly so that it extends vertically upwardly from the primary panel wherein the vertical secondary panel when the front panel assembly is in the extended positioned is spaced forwardly from a position of the vertical primary and second panels when the front panel assembly is in the retracted position and the storage space is defined by the vertical secondary panel, the right and left bracket plates and the elongated seat support member.
2. The automotive vehicle of claim 1 wherein the elongated support member and the right bracket plate cooperate to define a right recess and the elongated support member and the left bracket plate cooperate to define a left recess wherein when the front panel assembly is in the retracted position a right cover plate is received in the right recess and a left cover plate is received in the left recess.

3. The automotive vehicle of claim 2 wherein the right cover plate is rotatably coupled to the right bracket plate and the left cover plate is rotatably coupled to the left bracket plate.

4. The automotive vehicle of claim 3 wherein each cover plate has a flange extending from a periphery of that cover plate and a right end of the primary panel is coupled to the flange of the right cover plate and a left end of the primary panel is coupled to the flange of the left cover plate.

5. The automotive vehicle of claim 4 wherein when the front panel assembly is in the extended position a right end of the secondary panel abuts against the flange of the right cover plate and a left end of the secondary panel abuts against the flange of the left cover plate.

6. The automotive vehicle assembly of claim 5 wherein each of the right and left ends of the secondary panel includes at least one magnetic element and the right and left cover plates include at least one corresponding magnetic element wherein when the front panel assembly is in the extended position, the magnetic elements of the right and left ends of the secondary panel magnetically engage with corresponding magnetic elements of the right and left cover plates to retain the front panel assembly in the extended position.

7. The automotive vehicle of claim 1 wherein the front panel assembly is configured to be rotated from the extended position to the retracted position with the secondary panel extending horizontally rearwardly from the upper lateral edge of the primary panel such that the secondary panel provides a top cover over at least a portion of the storage compartment.

8. The automotive vehicle of claim 1 wherein the secondary panel includes at least one divider and a corresponding recess in which the divider is received, the divider pivotably attached to the secondary panel and when the front panel assembly is in the extended positon, the divider is pivotable from a retracted position where it is received in the corresponding recess to an extended positon where it extends outwardly from the recess and when the divider is in the extended position it divides the storage compartment into sub-compartments.

9. The automotive vehicle assembly of claim 1, including a latch mechanism that when in a locked state restricts the front panel assembly from being moved to the extended position and when in an unlocked state allows the front panel assembly to be moved to the extended position.

\* \* \* \* \*